United States Patent
Kitada

(10) Patent No.: US 8,179,900 B2
(45) Date of Patent: May 15, 2012

(54) EDGE NODE REDUNDANT SYSTEM IN LABEL SWITCHING NETWORK

(75) Inventor: Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 296 days.

(21) Appl. No.: 12/752,400

(22) Filed: Apr. 1, 2010

(65) Prior Publication Data

US 2010/0189115 A1    Jul. 29, 2010

Related U.S. Application Data

(63) Continuation of application No. PCT/JP2007/001166, filed on Oct. 25, 2007.

(51) Int. Cl.
*H04L 12/28* (2006.01)
*H04L 12/56* (2006.01)

(52) U.S. Cl. ............................ 370/395.53; 370/217

(58) Field of Classification Search .......... 370/216–218, 370/395.53; 709/239
See application file for complete search history.

(56) References Cited

U.S. PATENT DOCUMENTS

| | | | | |
|---|---|---|---|---|
| 6,728,205 | B1 * | 4/2004 | Finn et al. | 370/217 |
| 6,868,067 | B2 * | 3/2005 | Rostron | 370/241 |
| 7,283,465 | B2 * | 10/2007 | Zelig et al. | 370/219 |
| 7,512,063 | B2 * | 3/2009 | Vasseur et al. | 370/217 |
| 7,852,748 | B2 * | 12/2010 | Le Faucheur et al. | 370/217 |
| 2006/0072574 | A1 | 4/2006 | Akahane et al. | |
| 2007/0253326 | A1 * | 11/2007 | Saha et al. | 370/217 |

FOREIGN PATENT DOCUMENTS

| | | |
|---|---|---|
| JP | 2003-124971 | 4/2003 |
| JP | 2005-333257 | 12/2005 |
| JP | 2006-54766 | 2/2006 |
| JP | 2006-108954 | 4/2006 |
| WO | 2008/120267 | 10/2008 |

OTHER PUBLICATIONS

International Search Report dated Jan. 29, 2008, from the corresponding International Application.
P. Pan, et al. "Fast Reroute Extensions to RSVP-TE for LSP Tunnels" Network Working Group, Request for Comments: 4090, May 2005.
M. Lasserre, et al "Virtual Private LAN Service (VPLS) Using Label Distribution Protocol (LDP) Signaling" Network Working Group, Request for Comments: 4762, Jan. 2007.
D. Awduche, et al. "RSVP-TE: Extensions to RSVP for LSP Tunnels" Network Working Group, Request for Comments: 3209, Dec. 2001.
L. Martini, et al. "Pseudowire Setup and Maintenance Using the Label Distribution Protocol (LDP)" Network Working Group, Request for Comments: 4447, Apr. 2006.
E. Rosen, et al. "BGP/MPLS IP Virtual Private Networks" Network Working Group, Request for Comments: 4364, Feb. 2006.

* cited by examiner

*Primary Examiner* — Hassan Kizou
*Assistant Examiner* — Emmanuel Maglo
(74) *Attorney, Agent, or Firm* — Katten Muchin Rosenman LLP

(57) ABSTRACT

In a label switching network, in normal times, packet transfer is performed using a protection-target label switching path set between a primary edge node device and a remote edge node device. Then, when a failure occurs in the primary edge node device, a secondary edge node device takes over the label switching path session from the primary edge node device and operates as the start-point node or the end-point node of the protection-target label switching path, to continue packet transfer using a backup label switching path.

11 Claims, 21 Drawing Sheets

F I G. 4            RELATED ART

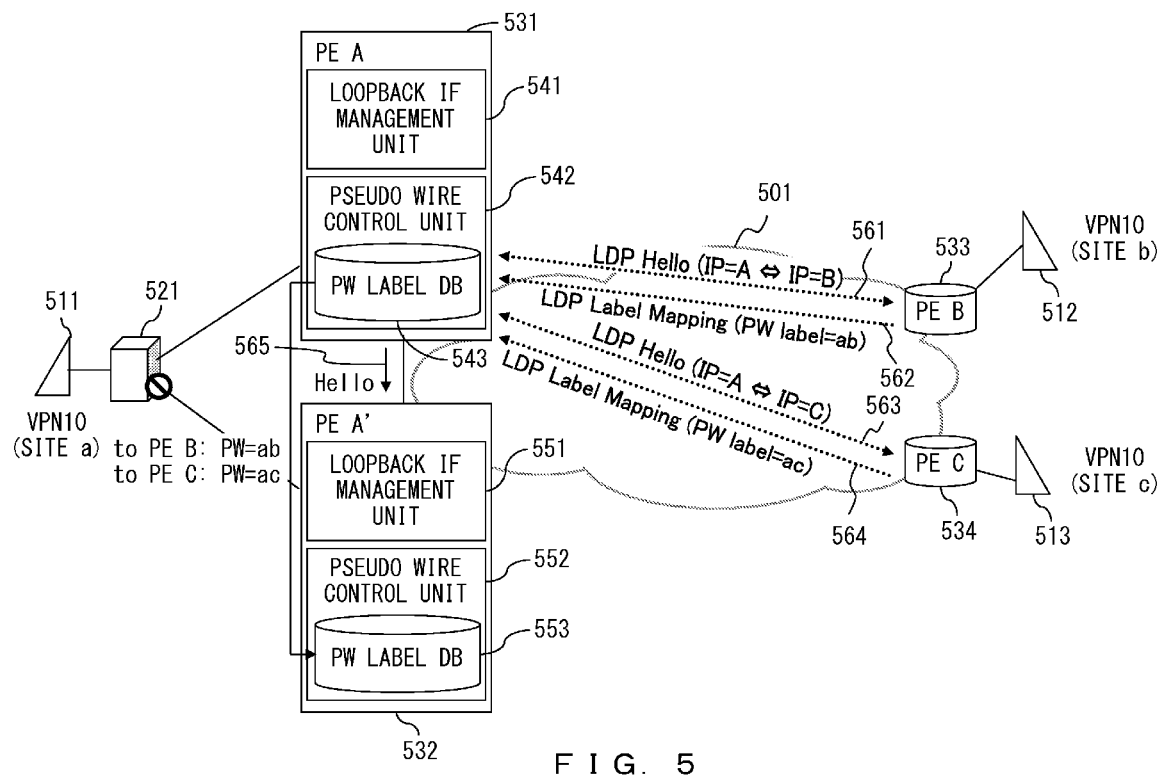
F I G. 5

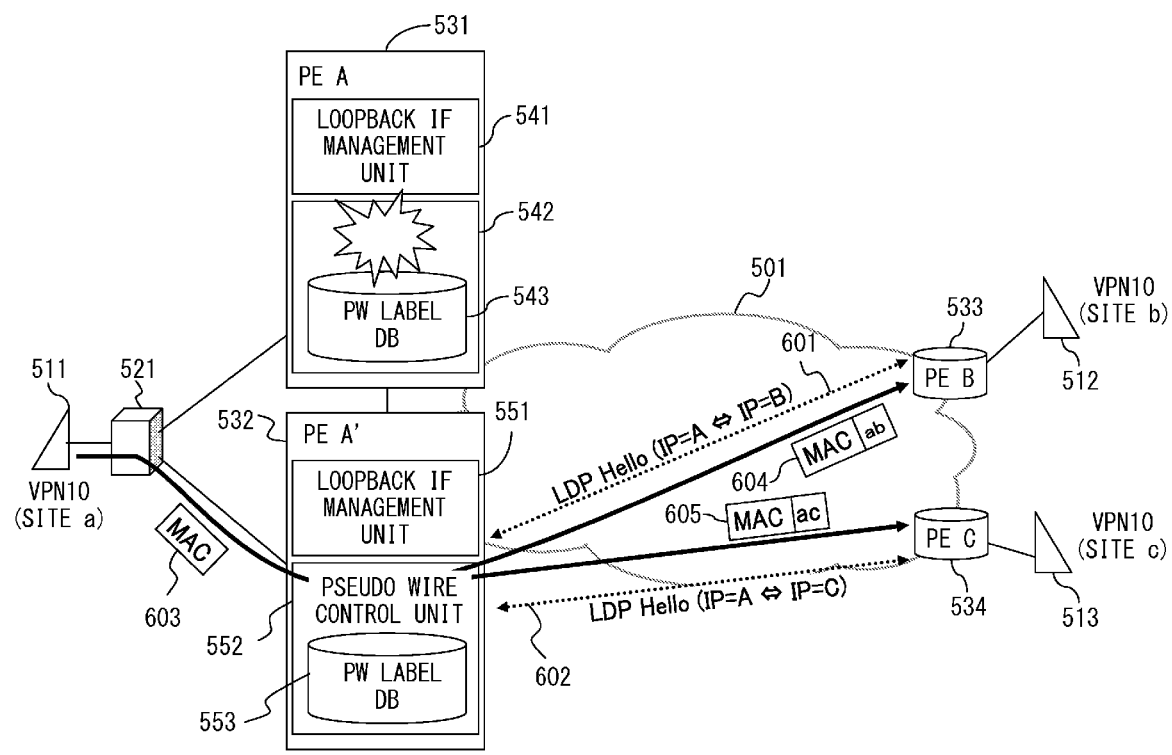
F I G. 6

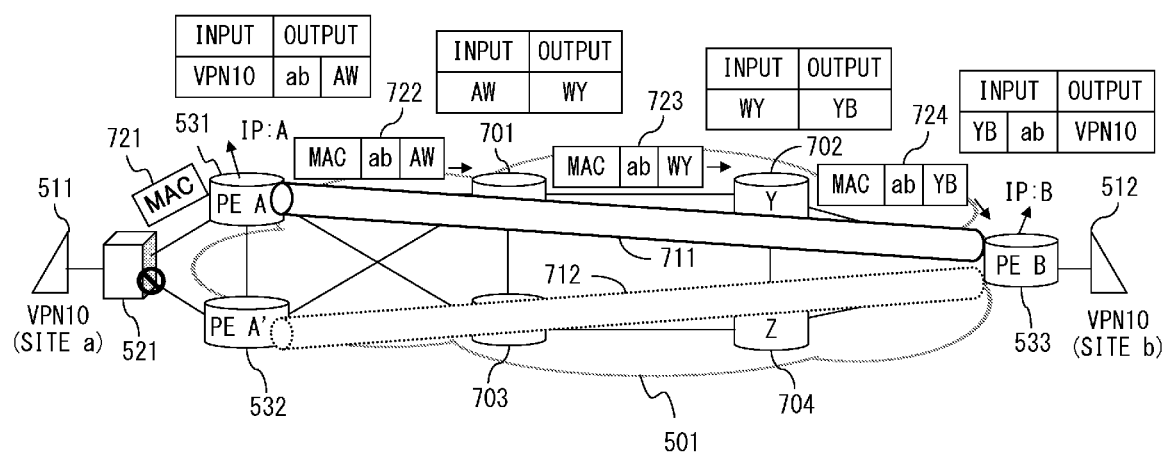
F I G. 7

| ID | TYPE OF MESSAGE | FUNCTION |
|---|---|---|
| 1 | Path | MESSAGE FOR DELIVERYING DATA FLOW INFORMATION FROM TRANSMITTER TO RECIPIENT |
| 2 | Resv | MESSAGE FOR DELIVERING RESERVATION REQUEST FROM RECIPIENT |
| 3 | Path-Err | MESSAGE REPRESENTING ERROR FOR PATH MESSAGE |
| 4 | Resv-Err | MESSAGE REPRESENTING ERROR FOR RESV MESSAGE |
| 5 | Path-Tear | MESSAGE FOR CANCELLING PATH STATE ON ROUTE |
| 6 | Resv-Tear | MESSAGE FOR CANCELLING RESERVATION ON ROUTE |
| 7 | Resv-Conf | RESERVATION CONFIRMATION MESSAGE |

FIG. 9

| ITEM | DETAIL |
|---|---|
| SESSION | DstAddress, Protocol ID, DstPor of DATA (INFORMATION ABOUT DATA) |
| RSVP_HOP | IP ADDRESS OF INTERFACE TRANMITTING Path MESSAGE (INFOMRATION ABOUT TRANSMISSION ROUTER) |
| SENDER_TEMPLATE | SrcAddress, Protocol ID, SrcPort OF DATA (INFORMATION RELATED TO DATA TRANSMITTER) |
| SENDER_TSPEC | BAND, MAXIMUM LENGTH etc. OF DATA (INFORMATION RELATED TO QoS OF DATA) |
| ADSPEC | INFORMATION RELATED TO QoS OF ROUTE (CORRECTED FOR EACH ROUTER TO GO THROUGH) |
| LABEL_REQUEST | MPLS LABEL DISTRIBUTION REQUEST |
| EXPLICIT_ROUTE | EXPLICIT ROUTE SPECIFICATION |
| SESSION_ATTRIBUTE | SPECIFICATION OF OPTION AND ATTRIBUTE OF LSP |
| FAST_REROUTE | Fast ReRoute REQUEST |

FIG. 11

| ITEM | DETAIL |
|---|---|
| SESSION | DstAddress, Protocol ID, DstPor of DATA (INFORMATION ABOUT DATA) |
| RSVP_HOP | IP ADDRESS OF INTERFACE TRANMITTING Path MESSAGE (INFOMRATION ABOUT TRANSMISSION ROUTER) |
| STYLE | Fixed-Filter, Shared Explicit, Wildcard (INFORMATION ABOUT TYPE OF RESERVATION) |
| FLOWSPEC | RESERVED BAND, MAXIMUM LENGTH, ETC. (INFORMATION ABOUT QoS OF DATA) |
| FILTERSPEC | SrcAddress. SrcPort OF DATA (INFORMATION ABOUT TRANSMITTER OF DATA) |
| ROUTE_RECORD | RECORDED ROUTE |
| RSVP_LABEL | ISSUED LABEL |

F I G. 1 2

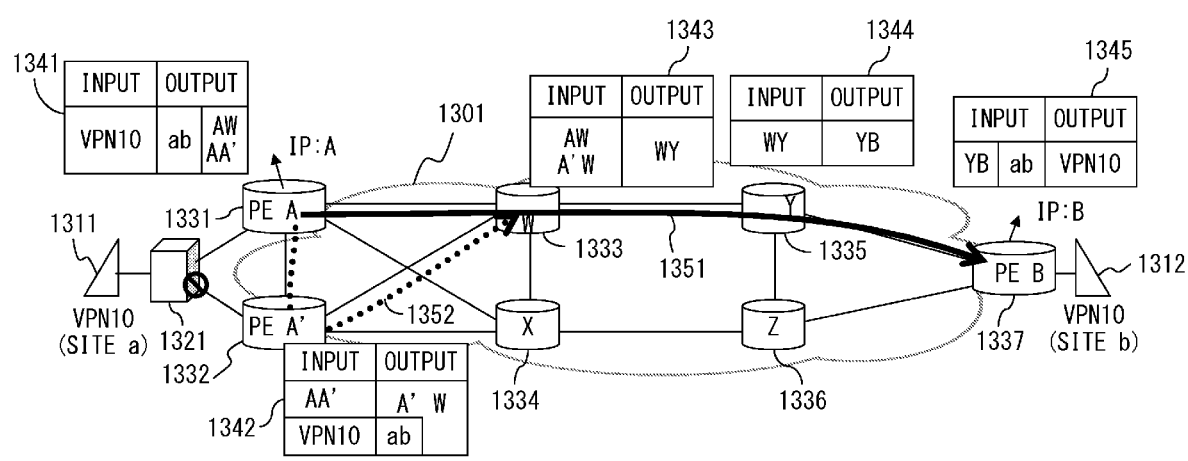
F I G. 13

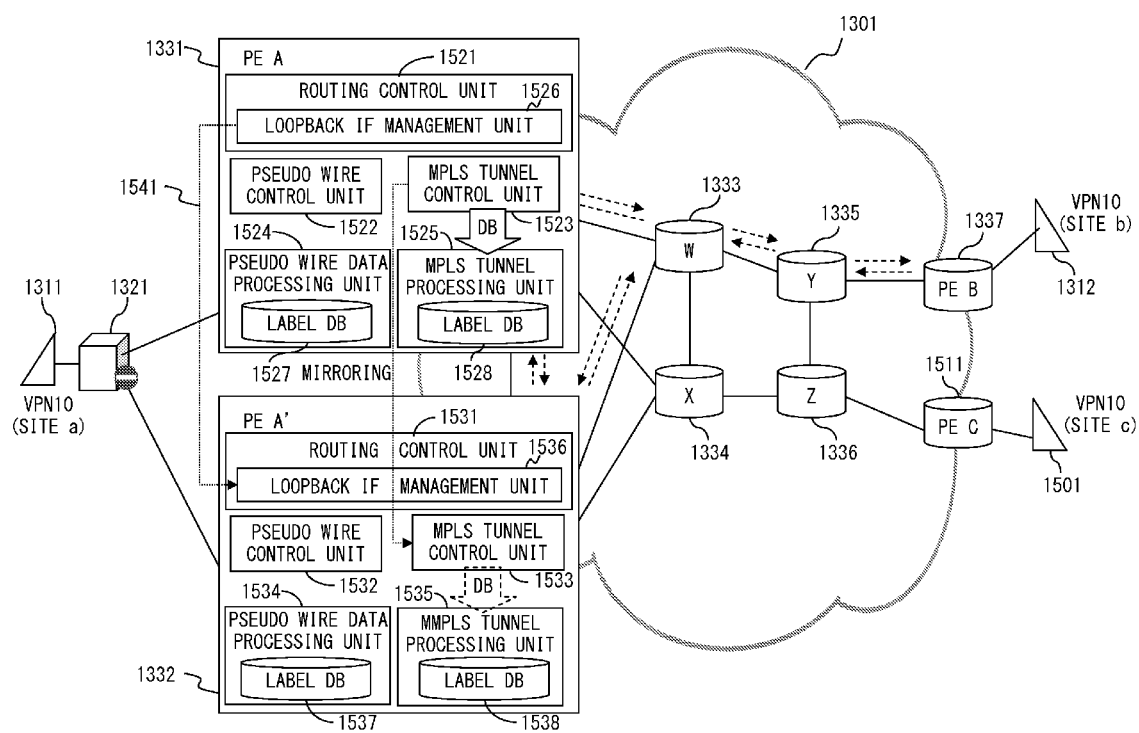
F I G. 15

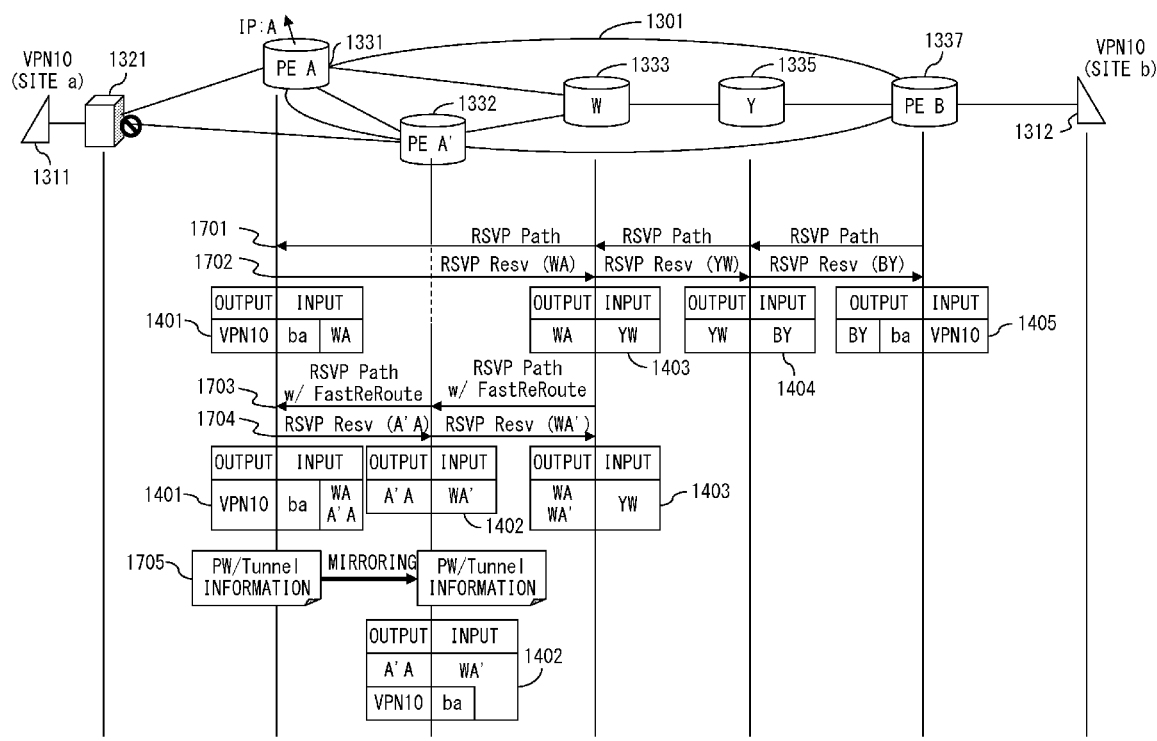
F I G. 1 7

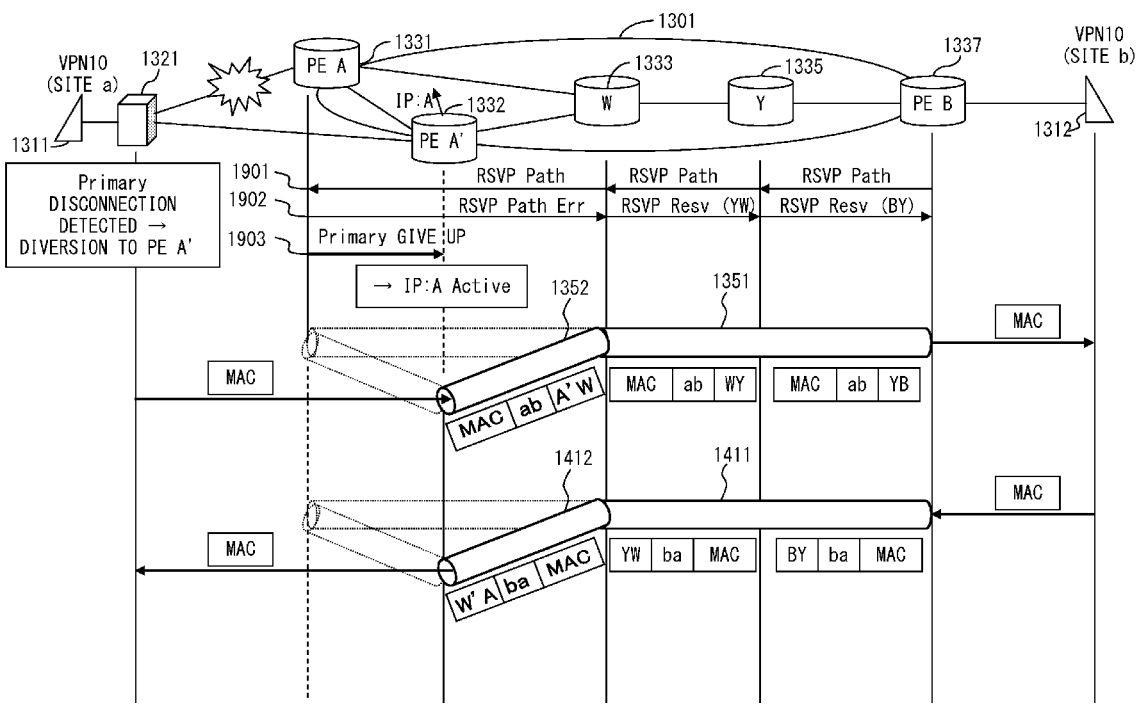
F I G. 19

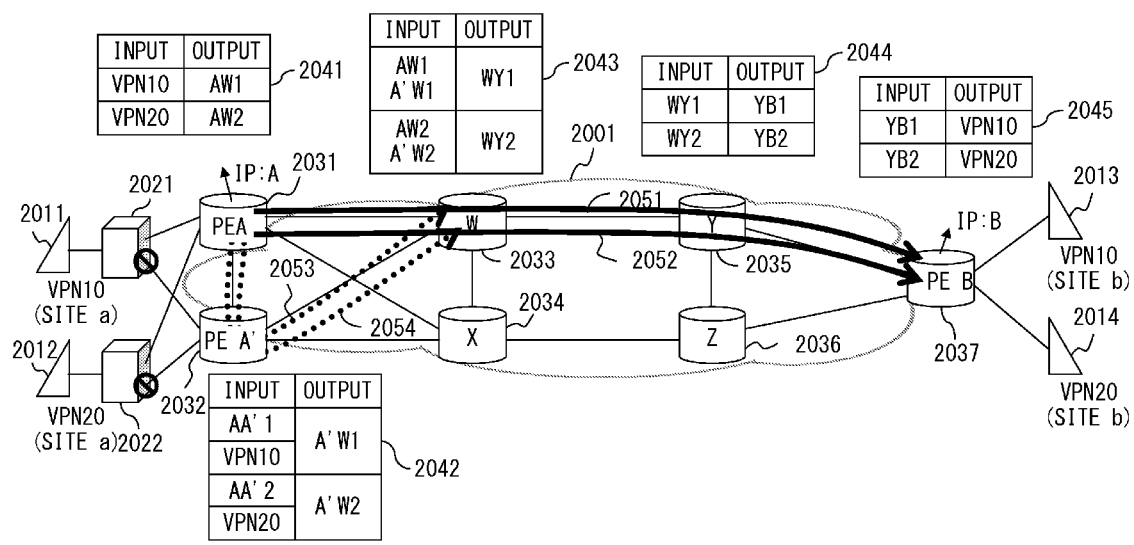
F I G. 20

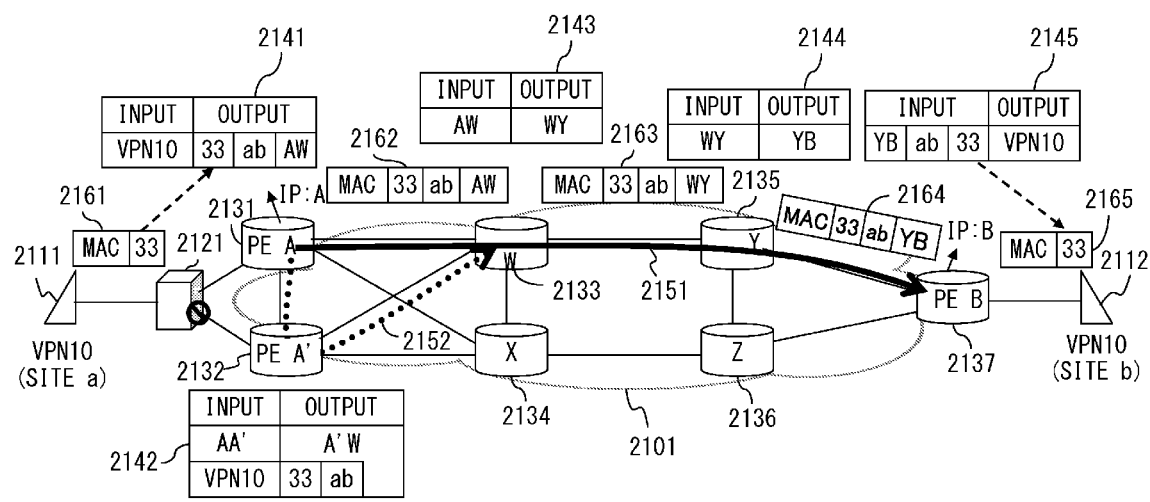
F I G. 21

EDGE NODE REDUNDANT SYSTEM IN LABEL SWITCHING NETWORK

CROSS-REFERENCE TO RELATED APPLICATIONS

This application is a continuation application of International PCT Application No. PCT/JP2007/001166 which was filed on Oct. 25, 2007.

FIELD

The embodiments discussed herein relate to an edge node redundant system and an edge node device in a label switching network providing a service by using a packet having one or more labels.

BACKGROUND

In a network using Multi Protocol Label Switching (MPLS), a protection technique called Fast Reroute (FRR) defined by Request for Comments (RFC) 4090 is broadly used.

FRR is one of fast failure recovery methods called Local Repair, and in FRR, for an MPLS tunnel Label Switching Path (LSP) that is to be protected (Protected LSP), a local bypass route (Backup LSP) is set in advance, to perform high-speed switching to the bypass route when a failure occurs in a link or a core node.

For example, in the case of link protection, as illustrated in FIG. 1, a Backup LSP 112 routed through nodes 106 and 107 is set between a node 102 and a node 103 for a Protected LSP 111 provided between a node 101 and a node 104. When a failure occurs in the link between the node 101 and the node 104, the path between the nodes is switched to the Backup LSP 112.

In the case of node protection, as illustrated in FIG. 2, a Backup LSP 113 routed through nodes 106-108 is set between a node 102 and a node 104 for the Protected LSP 111. When a failure occurs in the node 103, the path between the node 102 and the node 104 is switched to the Backup LSP 113.

Meanwhile, the method to set an end-to-end bypass route is called Global Repair. In this case, as illustrated in FIG. 3, a Backup LSP 114 routed through nodes 105-108 is set between the node 101 and the node 104 for the Protected LSP 111. When a failure occurs in the link between the node 101 and the node 104, the entirety of the Protected LSP 111 is switched to the Backup LSP 114.

FRR is a fast and effective protection technique, as the switching can be performed at 50 ms, and only half the number of tunnel LSPs end-to-end is required compared to Global Repair. However, while a failure in a link and a core node in an LSP path can be recovered, a failure in an edge node being the start point or the end point of a tunnel LSP cannot be recovered.

For example, in the case of an MPLS network illustrated in FIG. 4, a Protected LSP 431 is provided between an edge node 421 and an edge node 426. These edge nodes are called Provider Edge (PE). A customer device 411 communicates with a customer device 412 using the Protected LSP 431.

The protected LSP 431 includes core nodes 422-425, and a Backup LSP 432 routed through a core node 427 is provided between the node 422 and the node 423. Meanwhile, a Backup LSP 433 routed through core node 428 is provided between the node 423 and the node 425.

The node 422 corresponds to the start-point node of the LSP 432, and the node 423 corresponds to the end-point node of the Backup LSP 432 as well as the start-point node of the Backup LSP 433, and the node 425 corresponds to the end-point node of the Backup LSP 433. The start-point node of a Backup LSP is called Point of Local Repair (PLR), and the end-point node is called Merger Point (MP).

The Backup LSP 432 is used for the next hop protection targeted at the link between the start-point node 422 and the end-point node 423. Meanwhile, the Backup LSP 433 is used for the next next hop protection targeted at the link between the start-point node 423 and the node 424, the node 424, and the link between the node 424 and the end-point node 425.

Patent document 1 below relates to a communication device having an FRR function for MPLS.

Patent document 1: Japanese Laid-open Patent Publication No. 2003-124971

SUMMARY

According to an aspect of the embodiment, an edge node redundant system in a label switching network for transferring a packet having a tunnel label includes a primary edge node device and a secondary edge node device.

The primary edge node device includes a first tunnel control unit, first tunnel label database and a first tunnel processing unit, and the secondary edge node device includes a second tunnel control unit, a second tunnel label database and a second tunnel processing unit.

The first tunnel control unit sets a protection-target label switching path between a remote edge node device in the label switching network and the primary edge node device, sets a backup label switching path routed through the secondary edge node device and used as a bypass route for the protection-target label switching path, and transmits session information of the protection-target label switching path to the secondary edge node device.

The first tunnel label database stores a tunnel label of the protection-target label switching path and a tunnel label of the backup label switching path, and the first tunnel processing unit performs a packet transfer between the remote edge node device and the primary edge node using the first tunnel label database.

The second tunnel control unit receives the session information of the protection-target label switching path from the primary edge node device. The second tunnel label database stores the tunnel label of the backup label switching path.

The second tunnel processing unit takes over a label switching path session from the primary edge node device in accordance with the session information of the protection-target label switching path when a failure occurs in the primary edge node device, and performs a packet transfer between the remote edge node device and the secondary edge node device using the second tunnel label database. The secondary edge node device operates as a start-point node or an end-point node of the protection-target label switching path when the failure occurs in the primary edge node device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating VPLS service in normal times described in a prior application;

FIG. 6 is a diagram illustrating VPLS service at the time when a failure occurs in the primary edge node described in a prior application;

FIG. 7 is a diagram illustrating a tunnel LSP in normal times described in a prior application;

FIG. 9 is a diagram illustrating types and functions of RSVP messages;

FIG. 11 is a diagram illustrating objects contained in a Path message;

FIG. 12 is a diagram illustrating objects contained in a Resv message;

FIG. 13 is a diagram illustrating the setting operation in the upward direction in the edge node redundant system;

FIG. 15 is a diagram illustrating the configuration of the primary edge node and the secondary edge node;

FIG. 17 is a diagram illustrating the sequence of the setting operation in the downward direction;

FIG. 19 is a diagram illustrating the bypass operation at the time when a failure occurs in a line accessing the primary edge node;

FIG. 20 is a diagram illustrating a label switching network using one-level labels; and FIG. 21 is a diagram illustrating a label switching network using three-level labels.

DESCRIPTION OF EMBODIMENTS

Figure 1:
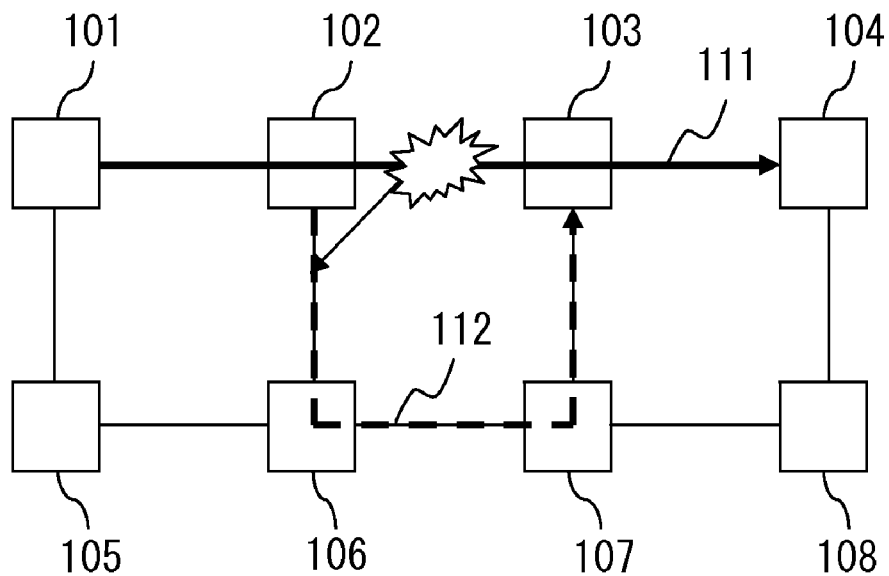
FIG. 1 is a diagram illustrating Local Repair according to the conventional link protection.
Figure 2:
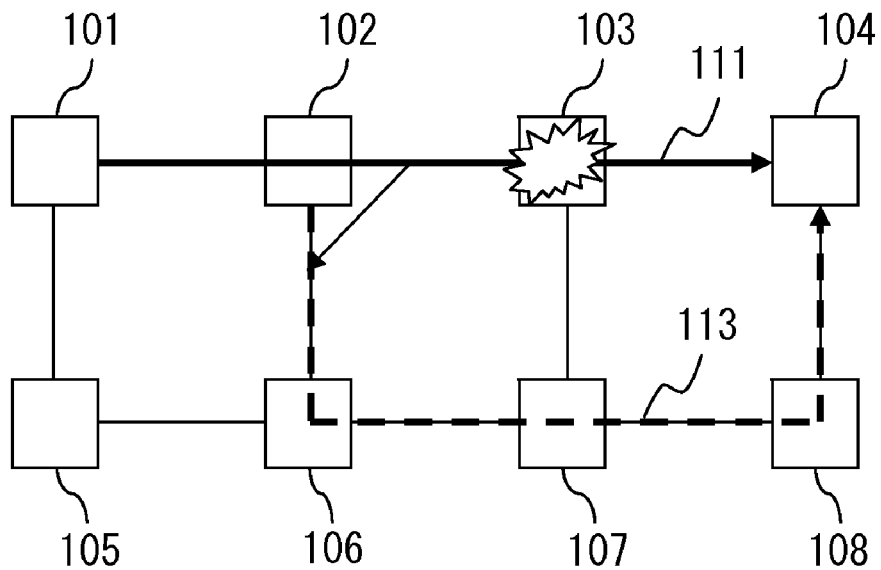
FIG. 2 is a diagram illustrating Local Repair according to the conventional node protection.
Figure 3:
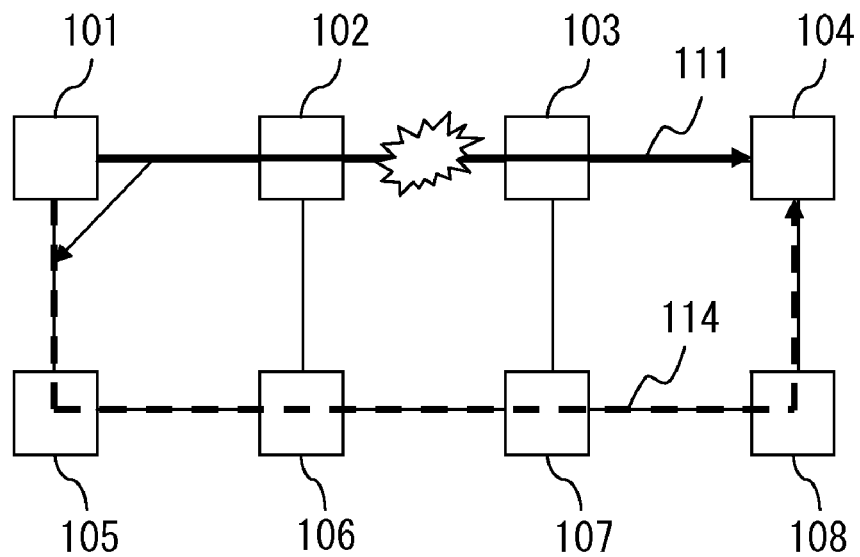
FIG. 3 is a diagram illustrating conventional Global Repair.
Figure 4:
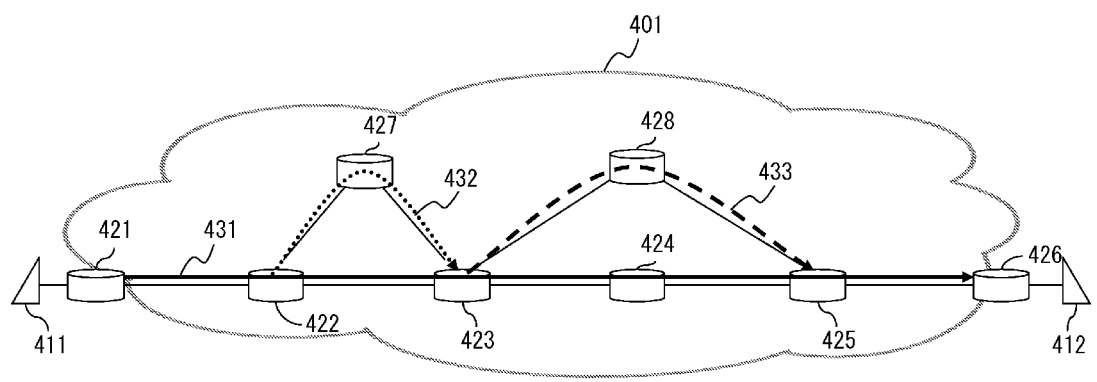
FIG. 4 is a diagram illustrating FRR in a conventional MPLS network.

As described earlier, in the MPLS network 401 illustrated in FIG. 4, the Backup LSP 432 is used for the next hop protection, and the LSP 433 is used for the next next hop protection, However, any Backup LSP cannot be provided for the protection of the edge nodes 421 and 426.

One of possible Virtual Private Network (VPN) services that can be provided by MPLS is the Local Area Network (LAN) service emulated on an Ethernet (registered trademark) line, for example. For this service, a method to make edge nodes redundant by accommodating a customer site in two edge nodes and using one as the primary system and the other as the secondary system, as in Virtual Private LAN Service (VPLS) over LDP defined by RFC 4762 is proposed.

However, according to the method descried in RFC 4762, an Ethernet (registered trademark) emulation line called a pseudo wire (PW) is required twice the number required at the nonredundant case. For this problem, a prior International PCT Application No. PCT/JP2007/000317 proposes a technique to make the number of PWs the same as that in the nonredundant case. In this case, the number of PWs in the redundant case is reduced by half compared to a conventional art.

FIG. 5 illustrates an example of such a VPLS service. In an MPLS network 501, edge nodes 531-534 are provided, and the primary edge node 531 (PE A) and the secondary edge node 532 (PE A') are connected to a customer device 511 of a site "a" through a customer site accommodating node (switch) 521. A customer device 512 of a site "b" and a customer device 513 of the site "c" are connected to an edge node 533 (PE B) and an edge node 534 (PE C), respectively.

The Internet Protocol (IP) addresses of the edge nodes 531-534 are A, A', B and C, respectively. A VPN10 is assigned to the customer devices 511-513 as a customer identifier.

The primary edge node 531 has a loopback interface management unit 541 and a pseudo wire control unit 542, and the pseudo wire control unit 542 holds a PW label database 543. In a similar manner, the secondary edge node 532 has a loopback interface management unit 551 and a pseudo wire control unit 552, and the pseudo wire control unit 552 holds a PW label database 553.

First, in normal times, the pseudo wire control unit 542 of the primary edge node 531 exchanges an LDP Hello messages 561 and 563 between remote edge nodes (PEs accommodating a customer remote site) 533 and 534.

In addition, the pseudo wire control unit 542 receives LDP Label Mapping messages 562 and 564 from the edge nodes 533 and 534, respectively, and stores PW labels contained in the messages in a PW label database 543 as setting information of the pseudo wires. In this case, ab and ac are stored as the PW labels of the pseudo wires for the edge nodes 533 and 534, respectively.

Next, the pseudo wire control unit 542 transfers the setting information to the pseudo wire control unit 552 of the secondary edge node 532 to share the setting information in the primary edge node 531 and the secondary edge node 532 (mirroring). The pseudo wire control unit 552 stores the received setting information in the PW label database 553.

The loopback interface management unit 531 of the primary edge node 531 holds the IP address A as a loopback address (session identifier) and while setting it valid (active), transfers the loopback address A to the loopback interface management unit 532 of the secondary edge node 532. The loopback interface management unit 532 holds the loopback address A, and sets it invalid (inactive). The secondary edge node 532 performs alive monitoring of the edge node 531 by using a Hello message 565 from the primary edge node 531.

Next, as illustrated in FIG. 6, when the Hello message 565 is discontinued and a failure of the primary edge node 531 is detected, the loopback interface management unit 532 activates the loopback address A. Then, the pseudo wire control unit 552 continues the communication with the remote edge nodes 533 and 534 using the activated loopback address A.

Thus, LDP Hello messages 601 and 602 are exchanged between the secondary edge node 532 and the remote edge nodes 533 and 534, and the LDP session is maintained. Meanwhile, when a Media Access Control (MAC) frame 603 is transmitted from the customer device 511, the pseudo wire control unit 552 attaches the PW labels ab and ac to the MAC frame 603 by referring to the PW label database 553, and generates packets 604 and 605. The packets 604 and 605 are transferred to the edge node 533 and 534, respectively.

Even if input interfaces (tunnels) are different, when the same PW label is attached to a received packet, the edge nods 533 and 534 recognize it as a packet of the same pseudo wire as the one before the occurrence of the failure. Therefore, there is no need to prepare different PW labels for the primary edge node 531 and the secondary edge node 532.

However, according to this method, while the number of PWs can be reduced by half compared to related arts, it still does not realize the reduction of the number of tunnel LSPs, as the tunnel LSPs are required between the secondary edge node and the remote edge node.

For example, as illustrated in FIG. 7, a case in which a tunnel LSP 711 routed through core nodes 701 and 702 is provided between the primary edge node 531 and the remote edge node 533, and a tunnel LSP 712 routed through core nodes 703 and 704 is provided between the secondary edge node 532 and the remote edge node 533, is considered. The IP addresses of the nodes 701-704 are W, Y, X and Z, respectively.

First, in normal times, a packet is transferred using the tunnel LSP 711. When a MAC frame 721 is transmitted from the customer device 511, the primary edge node 531 attaches a PW label ab and a tunnel label AW to the MAC frame 721, to generate a packet 722.

The node 701 changes the tunnel label AW of the packet 722 received from the primary edge node 531 to WY, to generate a packet 723. The node 702 changes the tunnel label WY of the packet 723 received from the node 701 to YB, to generate a packet 724. Then, the remote edge node 533 transfers the MAC frame contained in the packet 724 received from the node 702 to the customer device 512.

Figure 8:
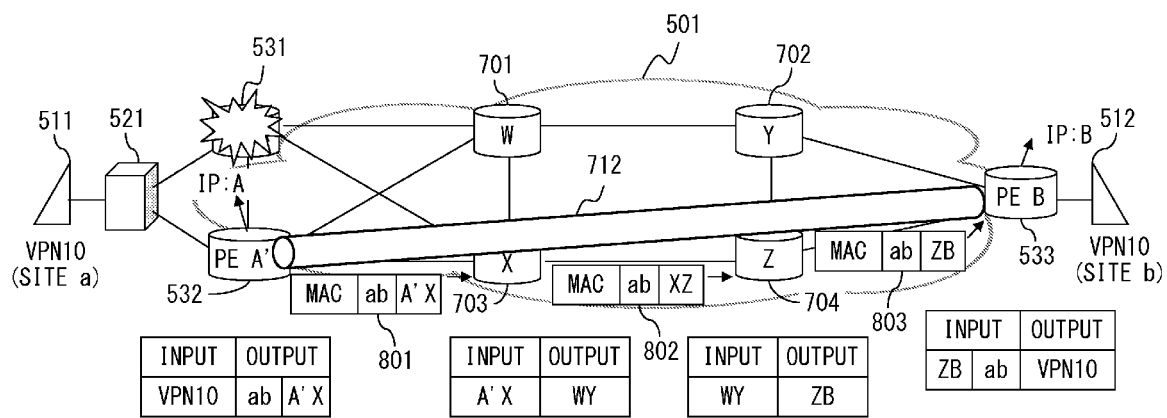
FIG. 8 is a diagram illustrating a tunnel LSP at the time when a failure occurs in the primary edge node described in a prior application.

Next, as illustrated in FIG. 8, when a failure occurs in the primary edge node 531 and the secondary edge node 532 is activated, a packet is transferred using the tunnel LSP 712. The secondary edge node 532 attaches a PW label ab and a tunnel label A'X to the MAC frame, to generate a packet 801.

The node 703 changes the tunnel label A'X of the packet 801 received from the secondary edge node 532 to XZ, to generate a packet 802. The node 704 changes the tunnel label XZ of the packet 802 received from the node 703 to ZB, to generate a packet 803. Then, the remote edge node 533 transfers the MAC frame contained in the packet 803 received from the node 704 to the customer device 512.

As described above, before and after the occurrence of the failure, the PW label of the packets received by the remote edge node 533 are the same, but the tunnel labels are changed. In other words, since another tunnel LSP is required between the secondary edge node and the remote edge node, the number of tunnel LSPs are not reduced compared to the conventional art.

A similar problem likely occurs, not only in the MPLS network 401 illustrated in FIG. 4 but also in other label switching networks.

Preferred embodiments of the present invention will be explained with reference to accompanying drawings.

First, referring to FIG. 9 through FIG. 12, the outline of Resource Reservation Protocol Traffic Extension (RSVP-TE) is described.

FIG. 9 illustrates the types of RSVP messages and their functions. A Path message is a message that delivers data flow information from a transmitter to a recipient, and an Resv message is a message that delivers a reservation request from a recipient. A Path-Err message and an Resv-Err message are error messages, a Path-Tear message and an Resv-Tear message are cancellation messages, and an Resv-Conf message is a reservation confirmation message.

Figure 10:
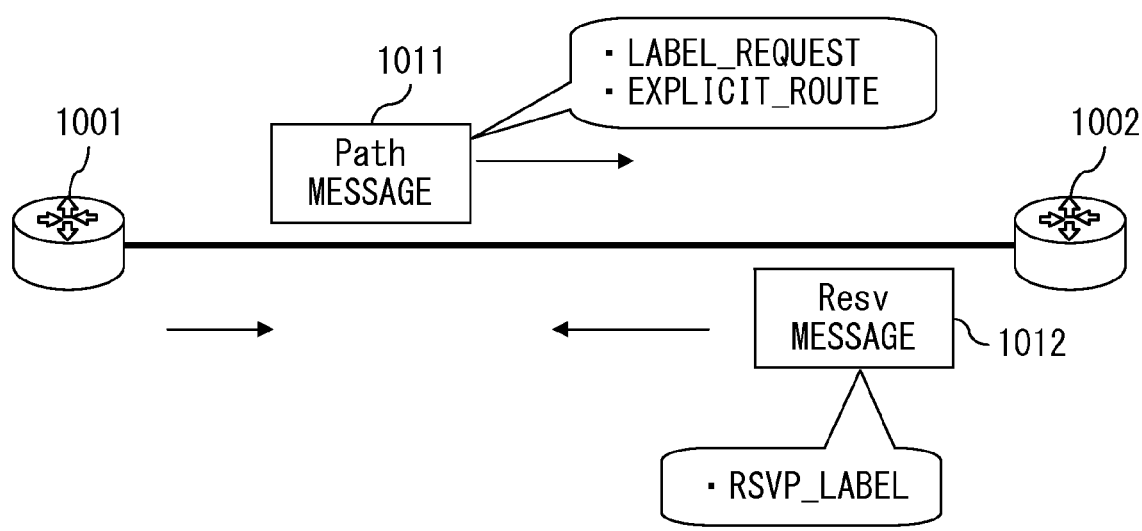
FIG. 10 is a diagram illustrating the extension part of RSVP-TE.

FIG. 10 illustrates the extension part of the RSVP-TE defined in RFC 3209. RSVP-TE is defined with its main purpose being the support of the LSP tunnel in MPLS, and supports the setting request of an LSP path that is routed explicitly. According to this protocol, a Downstream-on-Demand label distribution is performed.

An Ingress node 1001 transmits a Path message 1011 containing a LABEL_REQUEST object to an Egress node 1002, to request for label distribution. The Egress node 1002 returns an Resv message containing an RSVP_LABEL object, to notify the Ingress node 1001 of the label to be used. By including an EXPLICIT_ROUTE in the Path message 1011, the route of the LSP can be specified explicitly.

FIG. 11 illustrates the contents of the objects in the Path message in RSVP-TE. In the objects, LABEL_REQUEST, EXPLICIT_ROUTE, SESSION_ATTRIBUTE and FAST_REROUTE correspond to the extension part. LABEL_REQUEST represents an MPLS label distribution request, and EXPLICIT_ROUTE represents an explicit route specification. SESSION_ATTRIBUTE specifies the option and attribute of the LSP, and FAST_REROUTE represents an FRR request.

FIG. 12 illustrates the contents of the objects in the Resv message in RSVP-TE. In the objects, ROUTE_RECORD and RSVP_LABEL correspond to the extension part. ROUTE_RECORD represents a recorded route, and RSVP_LABEL represents an issued label.

Figure 14:
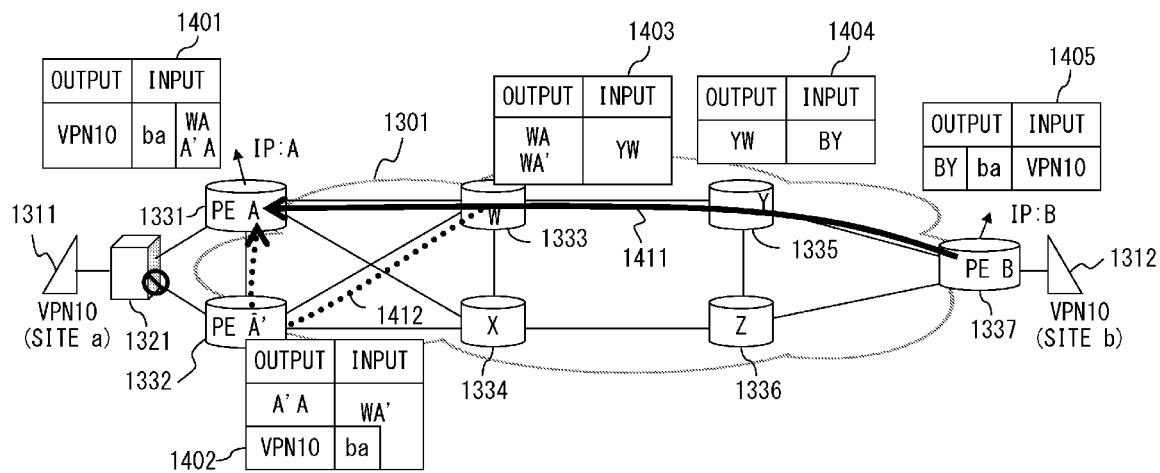
FIG. 14 is a diagram illustrating the setting operation in the downward direction in the edge node redundant system.

Next, the edge node redundant system of the present embodiment is described, referring to FIG. 13 through FIG. 15.

FIG. 13 and FIG. 14 illustrate the setting operations in the edge node redundant system in normal times in the upward and downward directions, respectively. In an MPLS network 1301, nodes 1331-1337 are provided, and a primary edge node 1331 (PE A) and a secondary edge node 1332 (PE A') constitute redundant edge nodes.

The primary edge node 1331 and the secondary edge node 1332 is connected to a customer device 1311 of a site "a" through a customer site accommodating node (switch) 1321. A customer device 1312 of a site "b" is connected to the edge node 1337 (PE B). The IP addresses of the nodes 1331-1337 are A, A', W, X, Y, Z and B, respectively. A VPN10 is assigned to the customer devices 1311 and 1312 as a customer identifier.

In the setting in the upward direction illustrated in FIG. 13, an MPLS tunnel LSP (Protected LSP) 1351 routed through core nodes 1333 and 1335 is provided between the primary edge node 1331 and the remote edge node 1337. Then, label tables 1341, 1343, 1344 and 1345 are set for the nodes 1331, 1333, 1335 and 1337, respectively.

Meanwhile, in the setting in the downward direction illustrated in FIG. 14, a Protected LSP 1411 routed through the core nodes 1335 and 1333 is provided between the remote edge node 1337 and the primary edge node 1331. Then, label tables 1401, 1403, 1404 and 1404 are set for the nodes 1331, 1333, 1335 and 1337, respectively.

A Backup LSP (FRR) 1352 in the upward direction for the Protected LSP 1351 and a Backup LSP 1412 in the downward direction for the Protected LSP 1411 are both set to be routed through the secondary edge node 1332. Then, the session information of the Protected LSPs 1351 and 1411 are transmitted from the primary edge node 1331 to the secondary edge node 1332, and shared between them.

The session information contains the IP addresses (session identifier) of the start-point node and the end-point node, and a tunnel label, and so on. Thus, label tables 1342 and 1402 of the Backup LSP 1352 and 1412 are set in the secondary edge node 1332.

As described above, in the secondary edge node 1332, the label tables 1342 and 1402 are set in advance, so that when a failure occurs in the primary edge node 1331, it operates as the start-point node of the LSP in the upward direction and as the end-point node in the downward direction. Then, when a failure occurs in the primary edge node 1331, the secondary edge node 1332 takes over the LSP session from the primary edge node 1331, and adopts (activates) the entry of the label tables 1342 and 1402.

Accordingly, while the secondary edge node 1332 is not the start-point node originally in the upward direction, it operates as a start-point node, and inserts the traffic transferred in the MPLS network to the Backup LSP 1352 (encapsulates a packet by the MPLS label). Meanwhile, while it is not the end-point node originally in the downward direction, it operates as the end-point node, and terminates the Backup LSP 1412 (decapsulates a packet with the MPLS label).

According to the configuration described above, even if a failure occurs in the primary edge node 1331, the LSP session (RSVP-TE session) is maintained, and the MPLS packet is transferred with the attachment of an issued label. Therefore, for the remote edge node 1337, it looks as if FRR (Local Repair) were performed. A notice of the occurrence of Local Repair is transmitted to the remote edge node 1337 in accordance with a message defined by RFC 4090.

The Protected LSP can be shared for use between the primary edge node 1331 and the secondary edge node 1332 just by partly adding a Backup LSP routed through the secondary edge node 1332, reducing the increase of the number of tunnel LSPs compared with the configuration illustrated in FIG. 7 and FIG. 8.

FIG. 15 illustrates the configuration of the primary edge node 1331 and the secondary edge node 1332. The primary edge node 1331 has a routing control unit 1521, a pseudo wire control unit 1522, an MPLS tunnel control unit 1523, a pseudo wire data processing unit 1524, and an MPLS tunnel processing unit 1525. The routing control unit 1521 includes a loopback interface management unit 1526, and the pseudo wire data processing unit 1524 and the MPLS tunnel processing unit 1525 hold label databases 1527 and 1528, respectively.

In a similar manner, the secondary edge node 1332 has a routing control unit 1531, a pseudo wire control unit 1532, an MPLS tunnel control unit 1533, a pseudo wire data processing unit 1534, and an MPLS tunnel processing unit 1535. The routing control unit 1531 includes a loopback interface management unit 1536, and the pseudo wire data processing unit 1534 and the MPLS tunnel processing unit 1535 holds label databases 1537 and 1538, respectively.

The routing control units 1521 and 1531 perform routing control of a transmitted packet. The loopback interface management unit 1526 of the primary edge node 1331 holds an IP address A as a loopback address while setting it active, and transfers the loopback address A to the loopback interface management unit 1536 of the secondary edge node 1332. The loopback interface management unit 1536 holds the loopback address A while setting it inactive, and performs alive monitoring of the primary edge node 1331 by using a Hello message 1541.

The pseudo wire control unit 1522 of the primary edge node 1331 performs the setting of the pseudo wire, and stores the setting information including a customer identifier and a PW label in the label database 1527. Then, the pseudo wire control unit 1522 transfers the setting information to the pseudo wire control unit 1532 of the secondary edge node 1332. The pseudo wire control unit 1532 stores the received setting information in the label database 1537.

The MPLS tunnel control unit 1523 of the primary edge node 1331 performs the tunnel setting for the Protected LSPs 1351 and 1411, and the Backup LSPs 1352 and 1412. The MPLS tunnel control unit 1533 of the secondary edge node 1332 performs the tunnel setting for the Backup LSPs 1352 and 1412. Then, the MPLS tunnel control units 1523 and 1533 store the setting information including a tunnel label in the label databases 1528 and 1538, respectively.

At this time, the MPLS tunnel control unit 1523 transfers the session information of the Protected LSPs 1351 and 1411 to the MPLS tunnel control unit 1533, and the MPLS tunnel control unit 1533 holds the received session information.

Thus, the entry of the label table 1341 in FIG. 13 is divided and stored in the label databases 1527 and 1528, and the entry of the label table 1342 is divided and stored in the label databases 1537 and 1538. The entries of the label table 1401 and 1402 in FIG. 14 are divided and stored in a similar way.

The pseudo wire data processing units 1524 and 1534 refer to the label database 1527 and 1537, and perform a process to attach the PW label to the MAC frame received from the customer site accommodating node 1321, and to remove the PW label from the packet received from the MPLS network 1301.

The MPLS tunnel processing units 1525 and 1535 refer to the label database 1528 and 1538, and perform a process to attach the tunnel label to the MAC frame received from the customer site accommodating node 1321, and to remove the tunnel label from the packet received from the MPLS network 1301.

Meanwhile, a remote edge node 1551 (PE C) having an IP address C is also provided in the MPLS network 1301. A customer device 1501 of a site "c" is connected to the edge node 1551, and a VPN10 is assigned to the customer device 1501 as a customer identifier.

Generally, when the VPN service is provided in the MPLS network, a VPN label (such as a PW label) for identifying the customer (VPN) is assigned to the packet in an MPLS edge node, and further a tunnel label for the transfer within the MPLS network is attached to the packet, which is then transferred. In this case, the MPLS core node transfers the packet, referring to the tunnel label only.

In this embodiment, the VPN setting information is also shared between the primary edge node and the secondary edge node and the secondary edge node sets the setting information in the label database of the Backup LSP in advance, making it possible to apply the redundant configuration of the edge nodes to the MPLS-VPN service.

Meanwhile, the MPLS-VPN service includes, as described above, VPLS that provides a LAN service emulated over the Ethernet (registered trademark) line, Virtual Private Wire Service (VPSW) (RFC 4447) that provides a point-to-point layer 2 service, and IP Virtual Private Network (IP-VPN) (RFC 4364) that encapsulates and transfers a layer 3 packet, etc. The method of sharing the VPN information in these services is described in International PCT Application No. PCT/JP2007/000317 mentioned above.

However, the layer (VPN layer) described in the International PCT Application and the layer (MPLS tunnel later) being the target in the present embodiment are different layers, and operate independently from each other.

Next, the operation in the case of providing the VPLS service in the MPLS network 1301 is described in more detail, referring to FIG. 16 through FIG. 19.

Figure 16:
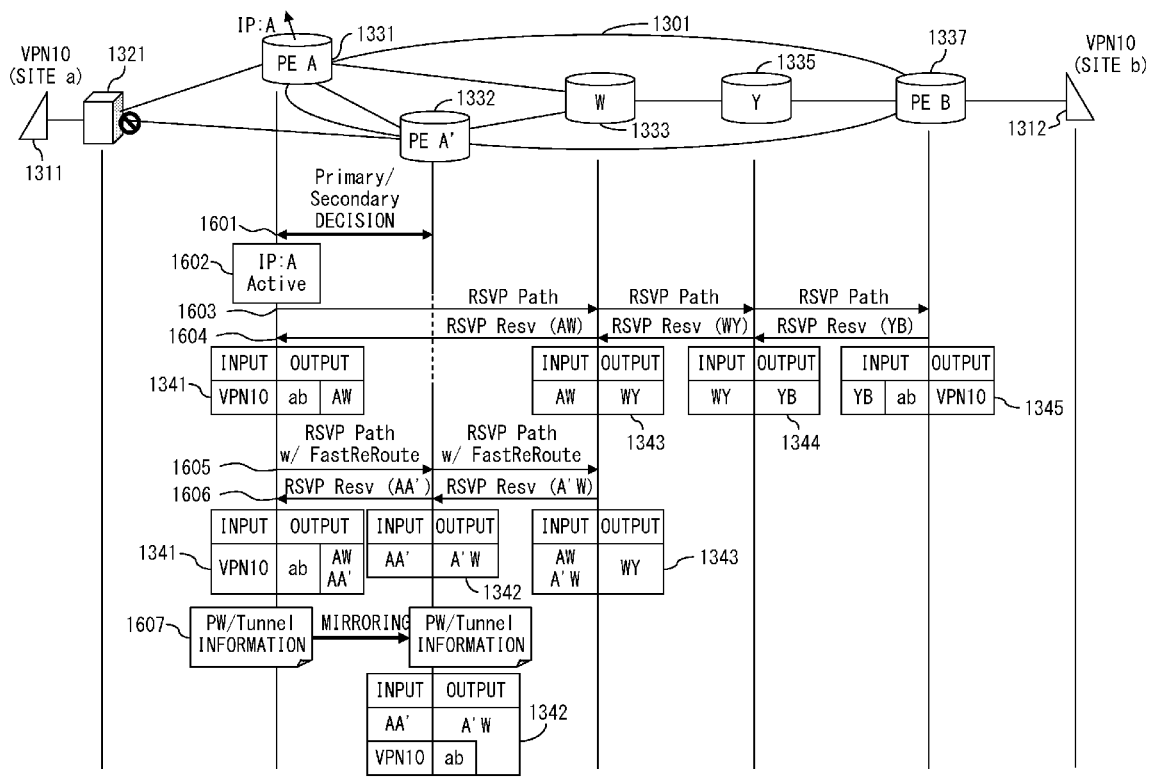
FIG. 16 is a diagram illustrating the sequence of the setting operation in the upward direction.

FIG. 16 illustrates the sequence of the setting operation in the upward direction illustrated in FIG. 13. First, to constitute the redundant edge nodes, the customer device 1311 of the site "a" is accommodated, with the edge node 1331 being the primary edge node and the edge node 1332 being the secondary edge node.

Here, by the negotiation between the edge node 1331 and the edge node 1332, the setting is made so that the edge node 1331 becomes the primary edge node (procedure 1601), and the loopback address A of the primary edge node 1331 is activated (procedure 1602). Accordingly, the customer site accommodating node 1321 recognizes the edge node 1331 as the primary edge node.

Next, the primary edge node 1331 sets a pseudo wire with the remote edge node 1337 accommodating the customer device 1312 of a remote site "b", in a similar manner as in the method illustrated in FIG. 5. At this time, the primary edge node 1331 uses the loopback address A as the LDP session identifier for setting the pseudo wire, and transmits it to the secondary edge node 1332. Then, the primary edge node 1331 distributes a PW label ba to the remote edge node 1337, and the remote edge node 1337 issues a PW label ab to the primary edge node 1331.

Next, the primary edge node 1331 sets a tunnel LSP using RSVP-TE. First, a Path message is transferred from the primary edge node 1331 through the core nodes 1333 and 1335 to the remote edge node 1337 (procedure 1603), and the notification of the tunnel label of the Protected LSP 1351 is transmitted by a returned Resv message (Procedure 1604). Accordingly, the label tables 1341, 1343, 1344 and 1345 of the nodes 1331, 1333, 1335 and 1337 are set.

Here, the customer identifier VPN10 is set as the input for the label table 1341, and the PW label ab and the tunnel label W are set as the output. Meanwhile, the tunnel labels AW and WY are set as the input and output of the label table 1343, respectively, and the tunnel labels WY and YB are set as the input and output of the label table 1344, respectively. Then, the tunnel label YB and the PW label ab are set as the input of the label table 1345, and the customer identifier VPN10 is set as the output.

Next, the primary edge node 1331 sets a Backup LSP 1352 using PSVP-TE. First, a Path message containing a FAST_REROUTE object is transferred from the edge node 1331 through the secondary edge node 1332 to the node 1333 (procedure 1605), and the notification of the tunnel label of the Backup LSP 1352 is transmitted by a returned Resv message (procedure 1606). Accordingly, a label table 1342 of the node 1332 is set, and a tunnel label is added to the label tables 1341 and 1343 of the nodes 1331 and 1333.

Here, tunnel labels AA' and A'W are set as the input and output of the label table 1342, respectively. Then, the tunnel label AA' is added to the output of the label table 1341, and the tunnel label A'W is added to the input of the label table 1343.

Next, the VPN setting information and the PSVP-TE session information of the Protected LSP 1351 is transmitted from the primary edge node 1331 to the secondary edge node 1332, and shared between them (procedure 1607).

The VPN setting information contains the customer identifier VPN10, the PW labels ba and ab etc., and the primary edge node 1331 and the secondary edge node 1332 synchronize by sharing the VPN setting information between them. Meanwhile, the RSVP-TE session information contains the IP addresses (session identifier) of the start-point node and the end-point node; when an explicit route is specified, the route; when a bandwidth is reserved, the bandwidth; and tunnel labels (AW, AA') issued to the primary edge node 1331, etc.

The secondary edge node 1332 holds the transmitted VPN setting information and the session information, and changes the label table 1342 so that the secondary edge node 1332 operates as the start-point node of the LSP when a failure occurs in the primary edge node 1331. Since the VPLS service is provided in this case, the customer identifier VPN10 is added to the input of the label table 1342, and a synchronized PW label ab is added to the output of the label table 1342.

FIG. 17 illustrates the sequence of the setting operation in the downward direction illustrated in FIG. 14. First, a Path message is transferred from the remote edge node 1337 through the core nodes 1335 and 1333 to the primary edge node 1331 (procedure 1701), and the notification the tunnel label of a Protected LSP 1411 is transmitted by a returned Resv message (Procedure 1702). Accordingly, label tables 1401, 1403, 1404 and 1405 of the nodes 1331, 1333, 1335 and 1337 are set.

Here, the PW label ba and the tunnel label WA are set as the input of the label table 1401, and the customer identifier VPN10 is set as the output of the label table 1401. Meanwhile, the tunnel labels YW and WA are set as the input and output of the label table 1403, respectively, and the tunnel labels BY and YW are set as the input and output of the label table 1404, respectively. Then, the customer identifier VPN10 is set as the input of the label table 1405, and the tunnel label BY and the PW label ba are set as the output of the label table 1405.

Next, a Path message containing a FAST_REROUTE object is transferred from the node 1333 through the secondary edge node 1332 to the primary edge node 1331 (procedure 1703), and the notification of the tunnel label of the Backup SLP 1412 is transmitted by a returned Resv message (procedure 1704). Accordingly, a label table 1402 of the node 1412 is set, and a tunnel label is added to the label tables 1401 and 1403 of the nodes 1331 and 1333.

Here, a tunnel labels WA' and A'A are set as the input and output of the label table 1402, respectively. Then, the tunnel label A'A' is added to the output of the label table 1401, and the tunnel label WA' is added to the input of the label table 1403.

Next, the VPN setting information and the PSVP-TE session information of the Protected LSP 1411 are transmitted from the primary edge node 1331 to the secondary edge node 1332, and shared between them (procedure 1705). In this case, the PSVP-TE session information contains the tunnel labels WA and A'A issued by the primary edge node 1331.

The secondary edge node 1332 holds the transmitted VPN setting information and the session information, and changes the label table 1402 so that the secondary edge node 1332 operates as the end-point node when a failure occurs in the primary edge node 1331. In this case, a synchronized PW label ba is added to the input of the label table 1402, and the customer identifier VPN10 is added to the output of the label table 1402.

In this case, as described above, a Backup LSP is set in the upward direction so that the core node 1333 becomes the MP, and a Backup LSP is set in the downward direction so that the core node 1333 becomes the PLR. However, as long as the Backup LSP is routed through the secondary edge node 1332, the MP and PLR of the Backup LSP does not necessarily have to be the core node 1333.

Meanwhile, while the same IP address A is used as the session identifiers of the RSVP-TE session and the LDP session (PW session), different addresses may be used as the respective session identifiers. The same applies to the RSVP-TE session identifier and the LDP session identifier (the same IP address B) in the remote edge node 1337.

Figure 18:
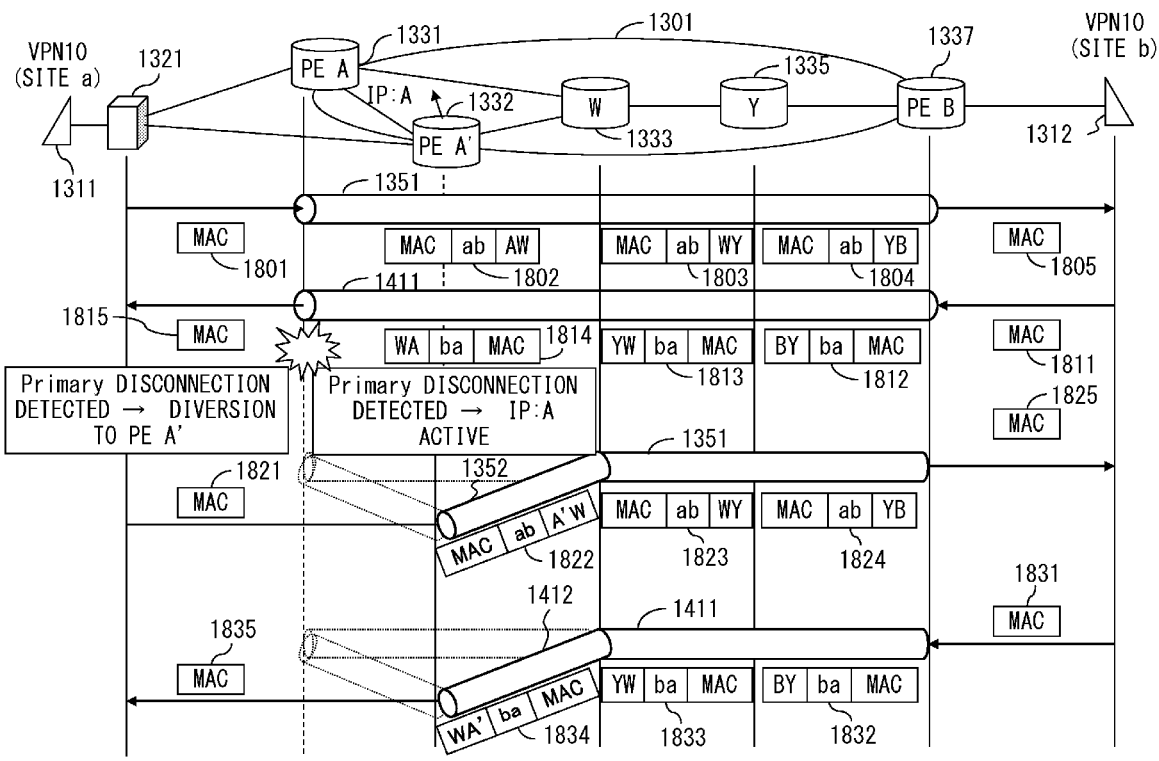
FIG. 18 is a diagram illustrating the bypass operation at the time when a failure occurs in the primary edge node.

FIG. 18 illustrates the bypass operation at the time when a failure occurs in the primary edge node 1331. In normal times, the primary edge node 1331 receives a data frame (MAC frame) 1801 from the customer device 1311, and transfers it to the remote edge node 1337 in the Protected LSP 1351.

At this time, the primary edge node 1331 attaches a PW label ab and a tunnel label AW to the MAC frame 1801, to generate a packet 1802. The node 1333 changes the tunnel label AW of the packet 1802 received from the primary edge node 1331 to WY, to generate a packet 1803. The node 1335 changes the tunnel label WY of the packet 1803 received from the node 1333 to YB, to generate a packet 1804. Then, the remote edge node 1337 transfers a MAC frame 1805 contained in the packet 1804 received from the node 1335, to the customer device 1312.

Next, the remote edge node 1337 receives a MAC frame 1881 from the customer device 1312, and transfers it to the primary edge node 1331 in the Protected LSP 1411.

At this time, the remote edge node 1337 attaches a PW label ba and a tunnel label BY to the MAC frame 1811, to generate a packet 1812. The node 1335 changes the tunnel label BY of the packet 1812 received from the remote edge node 1337 to YW, to generate a packet 1813. The node 1333 changes the tunnel label YW of the packet 1813 received from the node 1335 to WA, to generate a packet 1814. Then, the primary edge node 1331 transfers a MAC frame 1815 contained in the packet 1814 received from the node 1333, to the customer device 1311.

In normal times, when another pseudo wire or MPLS tunnel is newly established, the synchronization between the primary edge node 1331 and the secondary edge node 1332 is performed as needed, while in order to confirm that the primary edge node 1331 is active, alive monitoring by using a Hello message is performed. In addition, alive monitoring by using a Hello message is performed between the customer site accommodating node 1321 and the primary edge node 1331 as well, in accordance with RFC 4762.

Then, when a node failure occurs in the primary edge node 1331 and the discontinuation of the Hello message is detected, the secondary edge node 1332 activates the loopback address A, and activates the label table 1342 of the Backup LSP 1352 and the label table 1402 of the Backup LSP 1412. Accordingly, the secondary edge node 1332 maintains the LDP session and RSVP-TE session with the remote edge node 1337 in place of the primary edge node 1331.

Meanwhile, upon detecting the discontinuation of the Hello message, the customer site accommodating node 1321 diverts the MAC frame 1821 from the customer device 1311 so that it goes through the secondary edge node 1332.

The secondary edge node 1332 attaches a PW label ab and a tunnel label A'W to the diverted MAC frame 1821 in accordance with the label table 1342, to generate a packet 1822. Since the Backup LSP 1352 is merged with the Protected LSP 1351 in the node 1333, the packet 1822 ultimately reaches the remote edge node 1337.

The node 1333 changes the tunnel label A'W of the packet 1822 received from the secondary edge node 1332 to WY in accordance with the label table 1343, to generate a packet 1823. The node 1335 changes the tunnel label WY of the packet 1823 received from the node 1333 to YB, to generate a packet 1824. Then, the remote edge node 1337 transfers a MAC frame 1825 contained in the packet 1824 received from the node 1335, to the customer device 1312.

Next, the remote edge node 1337 attaches a PW label ba and a tunnel label BY to the MAC frame 1831 received from the customer device 1312, to generate a packet 1832. The node 1335 changes the tunnel label BY of the packet 1832 received from the remote edge node 1337 to YW, to generate a packet 1833. Since the node 1333 is the PLR of the Backup LSP 1412, the packet 1833 goes through the secondary edge node 1332.

The node 1333 changes the tunnel label YW of the packet 1833 received from the node 1335 to WA' in accordance with the label table 1403, to generate a packet 1834. Then, the secondary edge node 1332 terminates the Backup LSP 1412 in accordance with the label table 1402, and transfers the MAC frame 1835 contained in the packet 1834 received from the node 1333 to the customer device 1311.

Thus, before and after the occurrence of the failure, the PW label and the tunnel label of the packet transmitted/received from/by the remote edge node 1337 are the same, and for the remote edge node 1337, it looks as if FRR (Local Repair) were performed.

FIG. 19 illustrates the bypass operation at the time when a failure occurs in a line accessing the primary edge node 1331. When a failure occurs in the access line (primary line) between the customer site accommodating node 1321 and the primary edge node 1331, since the primary edge node 1331 itself has no failure, the discontinuation of the Hello message is not detected in the secondary edge node 1332. In this case, the customer accommodating node 1321 detects the discontinuation of the Hello message, and diverts the traffic so that it goes through the secondary edge node 1332.

The primary edge node 1331 detects the disconnection of the access line by detecting the discontinuation of the Hello message from the customer site accommodating node 1321. Then, upon receiving a Path message from the node 1333 (procedure 1901), the primary edge node 1331 returns a PathErr message (procedure 1902). Then, the node 1333 diverts the downward traffic so that it goes through the Backup LSP 1412.

In addition, the primary edge node 1331 transmits a message to give up the primary edge node due to the disconnection of the access line, to the secondary edge node 1332 (procedure 1903). Then, the secondary edge node 1332 activates the loopback address A, and activates the label table 1342 of the Backup LSP 1352 and the label table 1402 of the Backup LSP 1412. The subsequent transferring operation of the MAC frame is the same as that in the case in FIG. 18.

While a label stack of two-level labels including the PW label and the tunnel label is used for transferring the packet in the embodiment described above, the edge node redundant system of the present invention may be applied to, generally, any label switching network using labels in one or more levels.

FIG. 20 illustrates a label switching network using one-level labels. In an MPLS network 2001, the PW label is not used, and the packet is transferred using the tunnel label only. In the MPLS network 2001, nodes 2031-2037 are provided, and the primary edge node 2031 (PE A) and the secondary edge node 2032 (PE A') constitutes redundant edge nodes.

The primary edge node 2031 and the secondary edge node 2032 are connected to a customer device 2011 of a site a through a customer site accommodating node 2021, and to a customer device 2012 of the site "a" through a customer site accommodating node 2022. A customer device 2013 and a customer device 2014 of a site "b" are connected to the edge node 2037 (PE B). The IP addresses of the nodes 2031-2037 are A, A', W, X, Y, Z and B, respectively. A VPN10 is assigned to the customer devices 2011 and the 2013 as a customer identifier, and a VPN20 is assigned to the customer devices 2012 and 2014 as a customer identifier.

In this case, for communications between two sites, the multiplexing of different VPNs for one tunnel LSP is not performed, and respectively separate tunnel LSPs are used. Therefore, the upward traffic belonging to the VPN10 is transferred using a Protected LSP 2051 and a Backup LSP 2053, and the upward traffic belonging to the VPN20 is transferred using a Protected LSP 2052 and a Backup LSP 2054.

For this reason, the label table of each node stores two entries corresponding to the two kinds of tunnel LSPs. In this case, "1" is attached to the end of a tunnel label for the VPN10, and "2" is attached to the end of a tunnel label for the VPN20.

A label table 2041 of the primary edge node 2031 stores an entry having the customer identifier VPN10 as the input and an tunnel label AW1 as the output, and an entry having the customer identifier VPN20 as the input and a tunnel label AW2 as the output.

A label table 2042 of the secondary edge node 2032 stores an entry having a tunnel label AA'1 and the customer identifier VPN10 as the input and an tunnel label A'W1 as the output, and an entry having a tunnel label AA'2 the customer identifier VPN20 as the input and an tunnel label A'W2 as the output.

A label table 2043 of the node 2033 stores an entry having the tunnel labels AW1 and A'W1 as the input and a tunnel label WY1 as the output, and an entry having the tunnel labels AW2 and A'W2 as the input and a tunnel label WY2 as the output.

A label table 2044 of the node 2035 stores an entry having a tunnel label WY1 as the input and a tunnel label YB1 as the output, and an entry having a tunnel label WY2 as the input and a tunnel label YB2 as the output.

A label table 2045 of the remote edge node 2037 stores an entry having the tunnel label YB1 as the input and the customer identifier VPN10 as the output, and an entry having the tunnel label YB2 and the customer identifier VPN20 as the output.

In the downward direction, in a similar manner, the traffic belonging to the VPN10 and the traffic belonging to VPN20 are respectively transferred using different Protected LSPs and Backup LSPs.

FIG. 21 illustrates a label switching network using three-level labels. In an MPLS network 2101, the packet is transferred using the PW label, the tunnel label and another PW label. A VPN identifier such as a Virtual LAN (VLAN) identifier assigned by the customer is mapped onto the other PW label.

In the MPLS network 2101, nodes 2131-2137 are provided, and the primary edge node 2131 (PE A) and the secondary edge node 2132 (PE A') constitute redundant edge nodes.

The primary edge node 2131 and the secondary edge node 2132 are connected to a customer device 2111 of a site "a" through a customer site accommodating node 2121. A customer device 2112 of the site "b" is connected to the edge node 2137 (PE B). The IP addresses of the nodes 2031-2037 are A, A', W, X, Y, Z and B, respectively. A VPN10 is assigned to the customer devices 2111 and the customer devices 2112 as a customer identifier. The upward traffic belonging to the VPN10 is transferred using a Protected LSP 2151 and a Backup LSP 2152.

The customer identifier VPN10 is set as the input of a label table 2141 of the primary edge node 2131, and a tunnel label AW, a first PW label ab and a second PW label 33 are set as the output of the label table 2141. A tunnel label AA' and the customer identifier VPN10 are set as the input of a label table 2142 of the secondary edge node 2132, and a tunnel label A'W, the first PW label ab and the second PW label 33 are set as the output of the label table 2142.

The tunnel label AW is set as the input of a label table 2143 of the node 2133, and a tunnel label WY is set as the output of the label table 2143. The tunnel label WY is set as the input of a label table 2144 of the node 2135, and a tunnel label YB is set as the output of the label table 2144.

Then, the tunnel label YB, the first PW label ab and the second PW label 133 are set as the input of a label table 2145 of the remote edge node 2137, and the customer identifier VPN10 is set as the output of the label table 2145.

In normal times, the primary edge node 2131 receives a MAC frame 2161 from the customer device 2111, and transfers it to the remote edge node 2137 on the Protected LSP 2151.

A VLAN identifier 33 is attached to the MAC frame 2161, and the primary edge node 2131 maps the VLAN identifier 33 onto the second PW label 33. Then, a packet 2162 is generated by attaching the tunnel label AW, the first PW label ab and the second PW label 33 to the MAC frame 2161.

The node 2133 changes the tunnel label AW of the packet 2162 received from the primary edge node 2131 to WY, to generate a packet 2163. The node 2135 changes the tunnel label WY of the packet 2163 received from the node 2133 to YB, to generate a packet 2164.

Then, the remote edge node 2137 remaps the second PW label 33 contained in the packet 2164 received from the node 2135 onto the VLAN identifier 33, and transfers a MAC frame 2165 to the customer device 2112. In the downward direction, in a similar manner, the traffic is transferred using three-level labels.

As described above, in a label switching network, by setting a Backup LSP that goes through a secondary edge node, it becomes possible to make the edge nodes redundant, while keeping down the increase in the number of tunnel LSPs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An edge node redundant system in a label switching network for transferring a packet having a tunnel label, the edge node redundant system comprising:
   a primary edge node device; and
   a secondary edge node device,
wherein
   the primary edge node device comprises:
      a first tunnel control unit configured to set a protection-target label switching path between a remote edge node device in the label switching network and the primary edge node device, to set a backup label switching path routed through the secondary edge node device and used as a bypass route for the protection-target label switching path, and to transmit session information of the protection-target label switching path to the secondary edge node device;
      a first tunnel label database configured to store a tunnel label of the protection-target label switching path and a tunnel label of the backup label switching path; and
      a first tunnel processing unit configured to perform a packet transfer between the remote edge node device and the primary edge node using the first tunnel label database, the secondary edge node device comprises:

a second tunnel control unit configured to receive the session information of the protection-target label switching path from the primary edge node device;

a second tunnel label database configured to store the tunnel label of the backup label switching path; and a second tunnel processing unit configured to, when a failure occurs in the primary edge node device, take over a label switching path session from the primary edge node device in accordance with the session information of the protection-target label switching path and to perform a packet transfer between the remote edge node device and the secondary edge node device using the second tunnel label database, and the secondary edge node device operates as a start-point node or an end-point node of the protection-target label switching path when the failure occurs in the primary edge node device.

2. The edge node redundant system according to claim 1, wherein the label switching network transfers a packet having a plurality of labels including the tunnel label and one or more virtual private network labels, the primary edge node device further comprises:

a first virtual private network control unit configured to transfer a virtual private network label of a packet transferred using the protection-target label switching path to the secondary edge node device;

a first virtual private network label database configured to store the virtual private network label; and a first virtual private network processing unit configured to perform an addition or removal of the virtual private network label of the packet using the first virtual private network label database, and the second edge node device further comprises:

a second virtual private network control unit configured to receive the virtual private network label from the primary edge node device;

a second virtual private network label database configured to store the virtual private network label; and a second virtual private network processing unit configured to perform an addition or removal of the virtual private network label of the packet using the second virtual private network label database when the failure occurs in the primary edge node device.

3. The edge node redundant system according to claim 2, wherein the plurality of labels include the tunnel label and two or more virtual private network labels.

4. The edge node redundant system according to claim 1, wherein the secondary edge node device performs alive monitoring by using a message from the primary edge node device, and the second tunnel processing unit activates the second tunnel label database when the message from the primary edge node device is discontinued.

5. The edge node redundant system according to claim 1, wherein the primary edge node device transmits a line failure message to the secondary edge node device when a failure occurs in an access line accommodated in the primary edge node device, and the second tunnel processing unit activates the second tunnel label database upon receiving the line failure message.

6. A secondary edge node device constituting redundant edge nodes with a primary edge node device in a label switching network for transferring a packet having a tunnel label, the secondary edge node device comprising:

a tunnel control unit configured to receive, from the primary edge node device, session information of a protection-target label switching path set between a remote edge node device and the primary edge node device in the label switching network;

a tunnel label database configured to store a tunnel label of a backup label switching path routed through the primary edge node device and used as a bypass route for the protection-target label switching path; and a second tunnel processing unit configured to take over a label switching path session from the primary edge node device in accordance with the session information of the protection-target label switching path when a failure occurs in the primary edge node device, and to perform a packet transfer between the remote edge node device and the secondary edge node device using the tunnel label database, wherein the secondary edge node device operates as a start-point node or an end-point node of the protection-target label switching path when the failure occurs in the primary edge node device.

7. The secondary edge node device according to claim 6, wherein the label switching network transfers a packet having a plurality of labels including the tunnel label and one or more virtual private network labels, and the second edge node device further comprises:

a virtual private network control unit configured to receive a virtual private network label of a packet transferred using the protection-target label switching path from the primary edge node device;

a virtual private network label database configured to store the virtual private network label; and a virtual private network processing unit configured to perform an addition or removal of the virtual private network label of the packet using the virtual private network label database when the failure occurs in the primary edge node device.

8. The secondary edge node device according to claim 7, wherein the plurality of labels include the tunnel label and two or more virtual private network labels.

9. The secondary edge node device according to claim 6, wherein the secondary edge node device performs alive monitoring by using a message from the primary edge node device, and the tunnel processing unit activates the tunnel label database when the message from the primary edge node device is discontinued.

10. The secondary edge node device according to claim 6, wherein the primary edge node device transmits a line failure message to the secondary edge node device when a failure occurs in an access line accommodated in the primary edge node device, and the tunnel processing unit activates the tunnel label database upon receiving the line failure message.

11. A packet transfer method to transfer packets having a tunnel label in a label switching network comprising redundant edge nodes including a primary edge node device and a secondary edge node device, the packet transfer method comprising:

setting a protection-target label switching path between a remote edge node device in the label switching network and the primary edge node device;

setting a backup label switching path routed through the secondary edge node and used as a bypass route for the protection-target label switching path, transmitting session information of the protection-target label switching path to the secondary edge node device;

storing a tunnel label of the protection-target label switching path and a tunnel label of the backup label switching path in a tunnel label database of the primary edge node device;

storing the tunnel label of the backup label switching path in a tunnel label database of the secondary edge node device;

performing a packet transfer between the remote edge node device and the primary edge node, wherein the second edge node device takes over a label switching path session from the primary edge node device in accordance with the session information of the protection-target label switching path when a failure occurs in the primary edge node device, and performs a packet transfer as a start-point node or an end-point node of the protection-target label switching path.

* * * * *